US011927975B2

(12) United States Patent
Voo

(10) Patent No.: US 11,927,975 B2
(45) Date of Patent: Mar. 12, 2024

(54) REGULATOR CIRCUIT AND REFERENCE CIRCUIT HAVING HIGH PSRR AND SWITCH CIRCUIT THEREOF

(71) Applicant: PixArt Imaging Incorporation, Hsinchu (TW)

(72) Inventor: Chuang-Shen Voo, Penang (MY)

(73) Assignee: PIXART IMAGING INCORPORATION, Hsinchu (TW)

( * ) Notice: Subject to any disclaimer, the term of this patent is extended or adjusted under 35 U.S.C. 154(b) by 235 days.

(21) Appl. No.: 17/538,941

(22) Filed: Nov. 30, 2021

(65) Prior Publication Data

US 2023/0168704 A1 Jun. 1, 2023

(51) Int. Cl.

*G05F 1/575* (2006.01)
*G05F 1/46* (2006.01)
*G05F 3/26* (2006.01)

(52) U.S. Cl.

CPC .............. *G05F 1/575* (2013.01); *G05F 3/262* (2013.01)

(58) Field of Classification Search

CPC ........... G05F 1/575; G05F 1/468; G05F 3/262
See application file for complete search history.

(56) References Cited

U.S. PATENT DOCUMENTS 5,672,959 A * 9/1997 Der .......................... G05F 3/247 323/273
11,036,247 B1 * 6/2021 Wei .......................... G05F 1/575
11,353,903 B1 * 6/2022 Coban ...................... G05F 1/468
2023/0205245 A1 * 6/2023 Zhu .......................... G05F 1/468 323/280

FOREIGN PATENT DOCUMENTS

CN 106774592 A * 5/2017
GB 2541287 A * 2/2017 ............ G05F 3/242

* cited by examiner

*Primary Examiner* — Sisay G Tiku
(74) *Attorney, Agent, or Firm* — Tung & Associates

(57) ABSTRACT

A switch circuit includes: a switch coupled to control an electrical parameter of a main circuit. A. PSRR of the main circuit is determined by the switch; a first driver configured to operably drive the switch, wherein the first driver is powered by a supply current; and a supply transistor configured to operably generate the supply current, wherein the supply transistor is biased in a subthreshold region, such that the PSRR of the main circuit is higher than a predetermined level within a predetermined frequency range.

16 Claims, 11 Drawing Sheets

REGULATOR CIRCUIT AND REFERENCE CIRCUIT HAVING HIGH PSRR AND SWITCH CIRCUIT THEREOF

BACKGROUND OF THE INVENTION

Field of Invention

The present invention relates to a regulator circuit and a reference circuit. Particularly, it relates to a regulator circuit and a reference circuit having high PSRR (power supply rejection ratio). The present invention also relates to a switch circuit for use in the regulator circuit and the reference circuit for achieving high PSRR.

Description of Related Art

FIG. 1 shows a prior art reference circuit (reference circuit 1000). As shown in FIG. 1 below, an NMOS switch, M0, is used for trimming to adjust the temperature coefficient of a reference signal Vref. The switch M0 is large to negate the effect of the on resistance of the switch M0. However, as shown in FIG. 1, power supply noise 206 of the input power VDD can be injected from the driver 205 to an input terminal of the amplifier 100 through for example the parasitic capacitance Cgd of the switch M0.

A typical method used for filtering out the power supply noise to improve the PSRR is using a low pass filter 300 (usually an RC filter including a resistor and a capacitor) at the output as shown in FIG. 2. However, a large resistor and a large capacitor are required for offering sufficient band width of the low pass filter 300. For example, a low pass filter of 1 KHz cutoff frequency needs a 10 MΩ resistor and 10 pF capacitor. As shown in FIG. 3, the low pass filter 300 with 1 KHz cutoff frequency starts rejecting power supply noise from 1 KHz. In other words, noise with frequency below 1 KHz is not rejected. On the other hand, if a low pass filter of lower cutoff frequency is required, the chip area needed is large and the cost is increased.

Compared to the prior art shown in FIG. 1, this invention can improve the PSRR across a wide range of frequencies, with a relatively lower chip size and cost.

SUMMARY OF THE INVENTION

From one perspective, the present invention provides a switch circuit, comprising: a switch, coupled to control an electrical parameter of a main circuit, wherein a PSRR (power supply rejection ratio) of the main circuit is determined by the switch; a first driver, configured to operably drive the switch, wherein the first driver is powered by a supply current; and a supply transistor, configured to operably generate the supply current, wherein the supply transistor is biased in a subthreshold region, such that the PSRR of the main circuit is higher than a predetermined level within a predetermined frequency range.

In one preferred embodiment, wherein the switch circuit further includes a filtering capacitor coupled to an output terminal of the first driver.

In one preferred embodiment, the switch circuit further comprises a current mirror circuit, wherein the current mirror circuit includes the supply transistor and mirrors a bias current to the supply current, wherein the ratio of the bias current to the supply current is larger than 1 to an extent that the supply transistor is biased in the subthreshold region.

In one preferred embodiment, the supply transistor includes a PMOSFET which is coupled between a power source and a power terminal of the first driver.

In one preferred embodiment, the switch circuit further comprises a bypass transistor which is coupled in parallel with the supply transistor and is configured to operably bypass the supply transistor during transient.

In one preferred embodiment, the switch circuit further comprises a second driver configured to operably drive the bypass transistor, wherein the second driver is powered by a current source.

In one preferred embodiment, the bypass transistor includes a PMOSFET which is coupled between a power source and a power terminal of the first driver.

From another perspective, the present invention provides a reference circuit, comprising: a pair of reference devices having a predetermined bandgap; an amplification circuit, coupled to the pair of reference devices to generate a reference signal according to the bandgap of the pair of reference devices; and a switch circuit, coupled to the amplification circuit and is configured to operably control a gain of a feedback network coupled to the amplification circuit, the switch circuit including: a switch, wherein a PSRR (power supply rejection ratio) of the reference circuit is determined by the switch; a first driver, configured to operably drive the switch, wherein the first driver is powered by a supply current; and a supply transistor, configured to operably generate the supply current, wherein the supply transistor is biased in a subthreshold region, such that the PSRR of the reference circuit is higher than a predetermined level within a predetermined frequency range.

In one preferred embodiment, the switch is coupled to a resistor of the feedback network and is configured to operably trim the gain of the feedback network by controlling the switch on or off.

In one preferred embodiment, the reference circuit further comprises a filter circuit, wherein the filter circuit includes a resistor and a capacitor which are configured as a low pass filter for filtering the reference signal.

In one preferred embodiment, wherein the filter circuit further includes a second bypass transistor which is configured to operably bypass the low pass filter during a bypass mode.

From another perspective, the present invention provides a regulator circuit, configured to operably generate a regulated output signal, the regulator circuit comprising: a reference circuit, configured to operably generate a reference signal; an error amplifier, configured to operably generate an error amplification signal according to a difference between the reference signal and a feedback signal, wherein the feedback signal is correlated to the regulated output signal; and an output transistor, which is controlled by the error amplification signal and is configured to operably convert an input power to generate the regulated output signal; wherein the reference circuit includes: a pair of reference devices having a predetermined bandgap; an amplification circuit, coupled to the pair of reference devices to generate a reference signal according to the bandgap of the pair of reference devices; and a switch circuit, coupled to the amplification circuit and is configured to operably control a gain of a feedback network coupled to the amplification circuit, the switch circuit including: a switch, wherein a PSRR (power supply rejection ratio) of the reference circuit is determined by the switch; a first driver, configured to operably drive the switch, wherein the first driver is powered by a supply current; and a supply transistor, configured to operably generate the supply current, wherein the supply transistor is biased in a subthreshold region, such that the PSRR of the reference circuit is higher than a predetermined level within a predetermined frequency range.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 4:
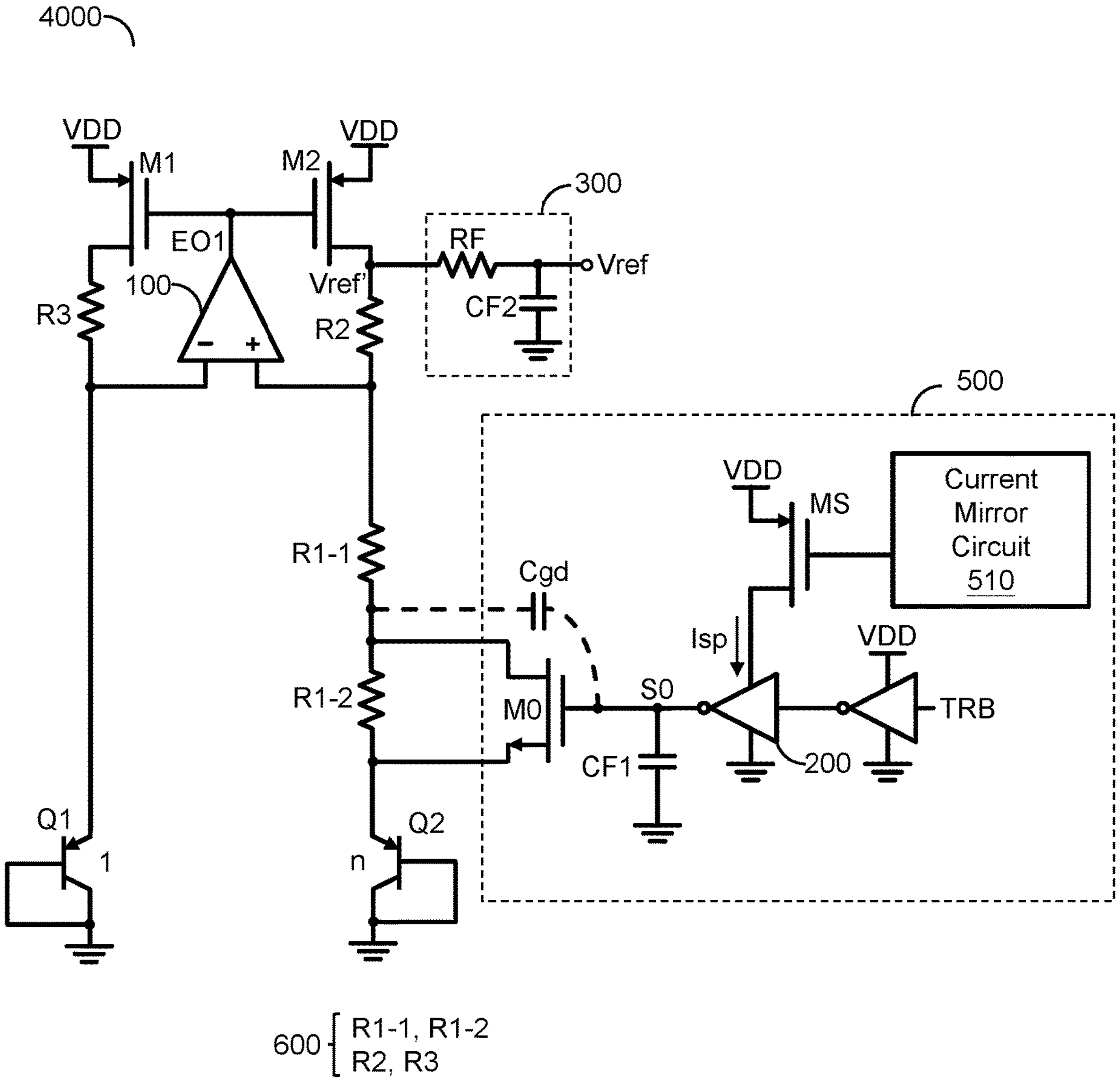
FIG. 4 shows a schematic diagram of a reference circuit according to an embodiment of the present invention.

Refer to FIG. 4 which shows a schematic diagram of a reference circuit (reference circuit 4000) according to an embodiment of the present invention. In this embodiment, the reference circuit 4000 comprises a pair of reference devices (bipolar transistors Q1, Q2 in this embodiment), an amplification circuit 100 and a switch circuit 500. The amplification circuit 100 is coupled to the bipolar transistors (Q1, Q2) to generate a reference signal Vref according to the bandgap of the bipolar transistors Q1, Q2. It is noteworthy that other types of reference devices, such as MOSFETs having bandgap difference, can be alternatively employed in the reference circuit for generating the reference signal Vref.

Still referring to FIG. 4, the switch circuit 500 is coupled to the amplification circuit 100 and is configured to operably control a gain of a feedback network 600 coupled to the amplification circuit 100. In this embodiment, the feedback network 600 includes resistors R1-1, R1-2, R2, R3, which provide variable gain control for adjusting the temperature coefficient of the reference circuit 4000.

In one embodiment, the switch circuit 500 includes a switch M0, a first driver 200 and a supply transistor Ms. In this embodiment, the switch M0 is connected with the resistor R1-2 in parallel and is configured to operably trim the gain of the feedback network 600 by controlling the switch M0 on or off, so as to adjust the temperature coefficient of the reference circuit 4000. As shown in FIG. 4, since the switch M0 is coupled to the input of the amplification circuit 100, as mentioned earlier, noise of the input power VDD is apt to be injected to amplification circuit 100 through the parasitic capacitance Cgd of the switch M0, and causing noise to the reference signal Vref. In other words, at least a portion of the PSRR of the reference circuit 4000 is determined by the switch M0.

The first driver 200 is configured to operably drive the switch M0 according to a trimming signal TRB. To improve the PSRR, in this embodiment, the first driver 200 is powered by a supply current Isp. The supply transistor Ms is configured to operably generate the supply current Isp. In one embodiment, the supply transistor Ms is biased in a subthreshold or deep subthreshold region while providing the supply current Isp, such that the PSRR of the reference circuit 4000 is higher than a predetermined level within a predetermined frequency range.

Figure 5:
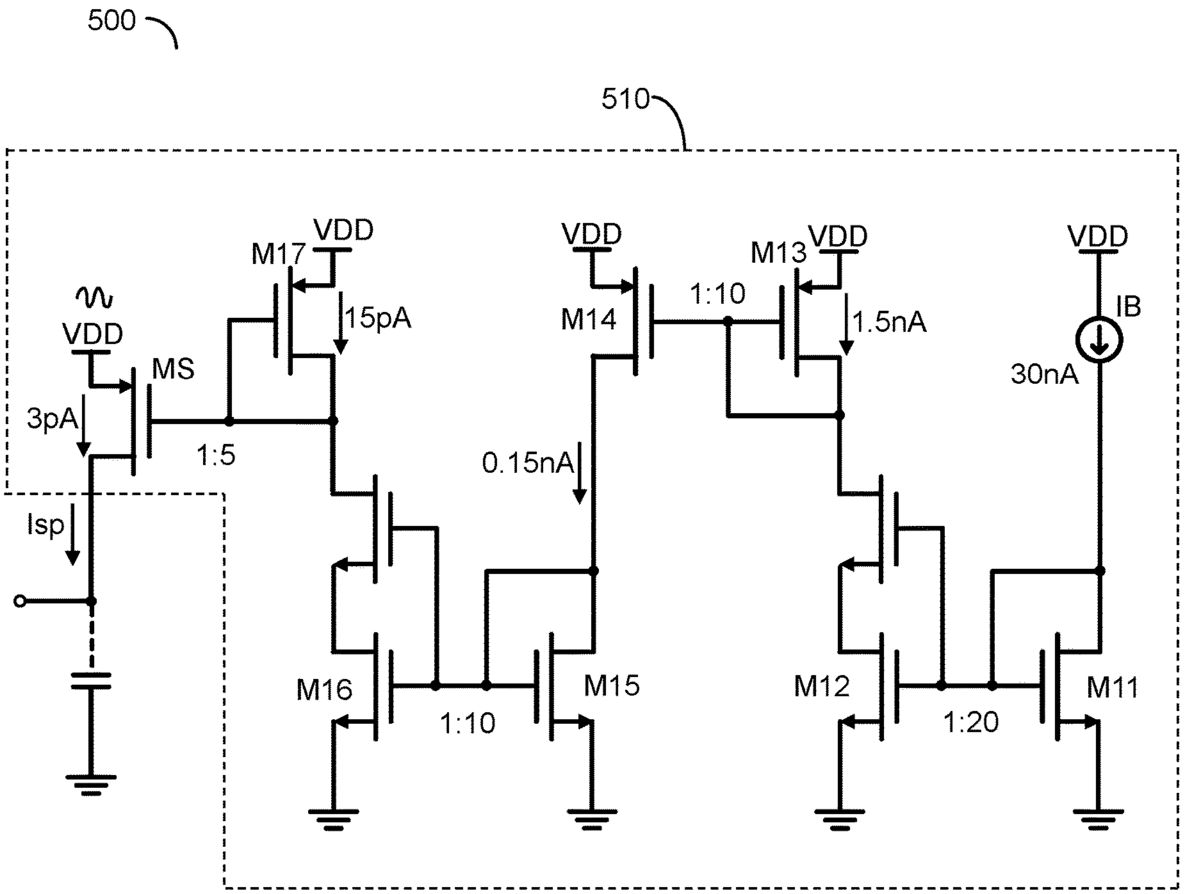
FIG. 5 shows a schematic diagram of a current mirror circuit of the switch circuit according to a specific embodiment of the present invention.

Refer to FIG. 4 in conjunction with FIG. 5 which shows a schematic diagram of a current mirror circuit (current mirror circuit 510) of the switch circuit according to a specific embodiment of the present invention. In this embodiment, the switch circuit 500 further includes a current mirror circuit 510, wherein the current mirror circuit 510 includes the supply transistor Ms and mirrors a bias current IB to the supply current Isp. In a preferred embodiment, the ratio of the bias current IB to the supply current Isp can be much larger than 1. In one preferred embodiment, the ratio of the bias current IB to the supply current Isp can be as large as tens of thousands, so that the supply current Isp is close to, for example at the same order of, the leakage current of the supply transistor Ms.

In one particular embodiment, as shown in FIG. 5, the bias current IB is 30 nA, the MOSFETs M11-M17 and MS forming the cascaded current mirrors provides ratios of the bias current of 1:20, 1:10, 1:10 and 1:5. In other words, the ratio of supply current Isp to the bias current IB is 1:10000, in this embodiment. The supply current Isp can be as low as 3 pA, such that the supply transistor Ms operates in the subthreshold region or deep subthreshold region. Note that the numbers listed in this embodiment is for illustrating purpose and are not for limiting the scope of the invention.

Please still refer to FIG. 4 and FIG. 5. In one embodiment, a filtering capacitor CF1 is coupled to the current path of the supply current Isp for further filtering, such that the power noise can be further filtered. In one specific embodiment, as shown in FIG. 4, the filtering capacitor CF1 is coupled to the output terminal of the first driver 200. From one perspective, when the control signal S0 is pulled high by the first driver 200, the supply transistor Ms and the filtering capacitor CF1 substantially form a filter having sufficient low cutoff frequency, thanks to the high equivalent resistance of the supply transistor Ms which is biased in the deep subthreshold region. As shown in FIG. 4 and FIG. 5, in one embodiment, the supply transistor Ms is a PMOSFET and is connected between the input power VDD and the power terminal of the first driver 200.

From one perspective, when the supply transistor Ms operates in the subthreshold region, the equivalent resistance is high to an extent that the bandwidth of the combination of the supply transistor Ms and the filtering capacitor CF1 can be much lower than conventional RC (resistor, capacitor) filters, and can occupy much less chip size than conventional RC filters.

Please refer back to FIG. 4. In one embodiment, the reference circuit 4000 further comprises a filter circuit 300.

The filter circuit 300 includes a resistor RF and a capacitor CF2 which are configured as a low pass filter. The filter circuit 300 is configured to further filter power noise within higher frequency band.

Figure 1:
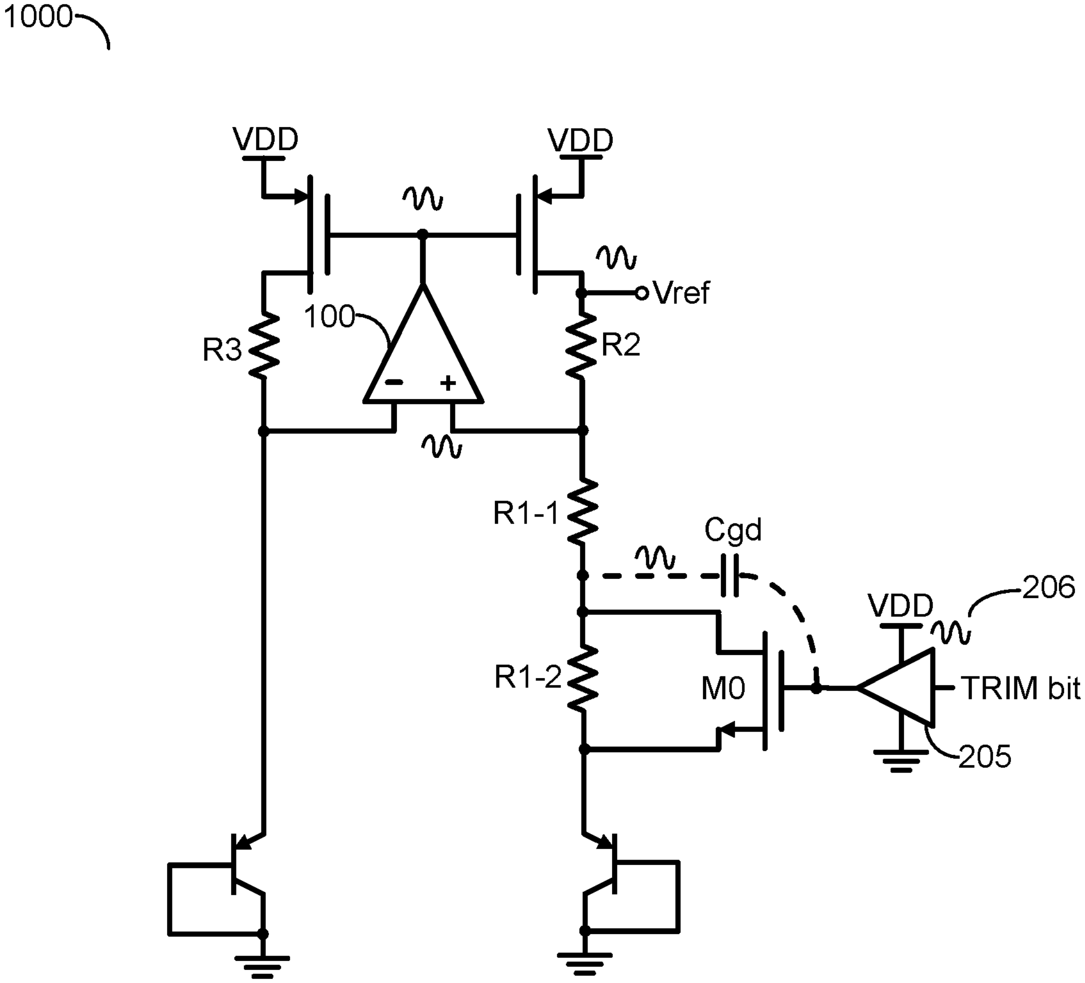
Fig. 1 (Prior Art)
FIG. 1 shows a prior art reference circuit.
Figure 2:
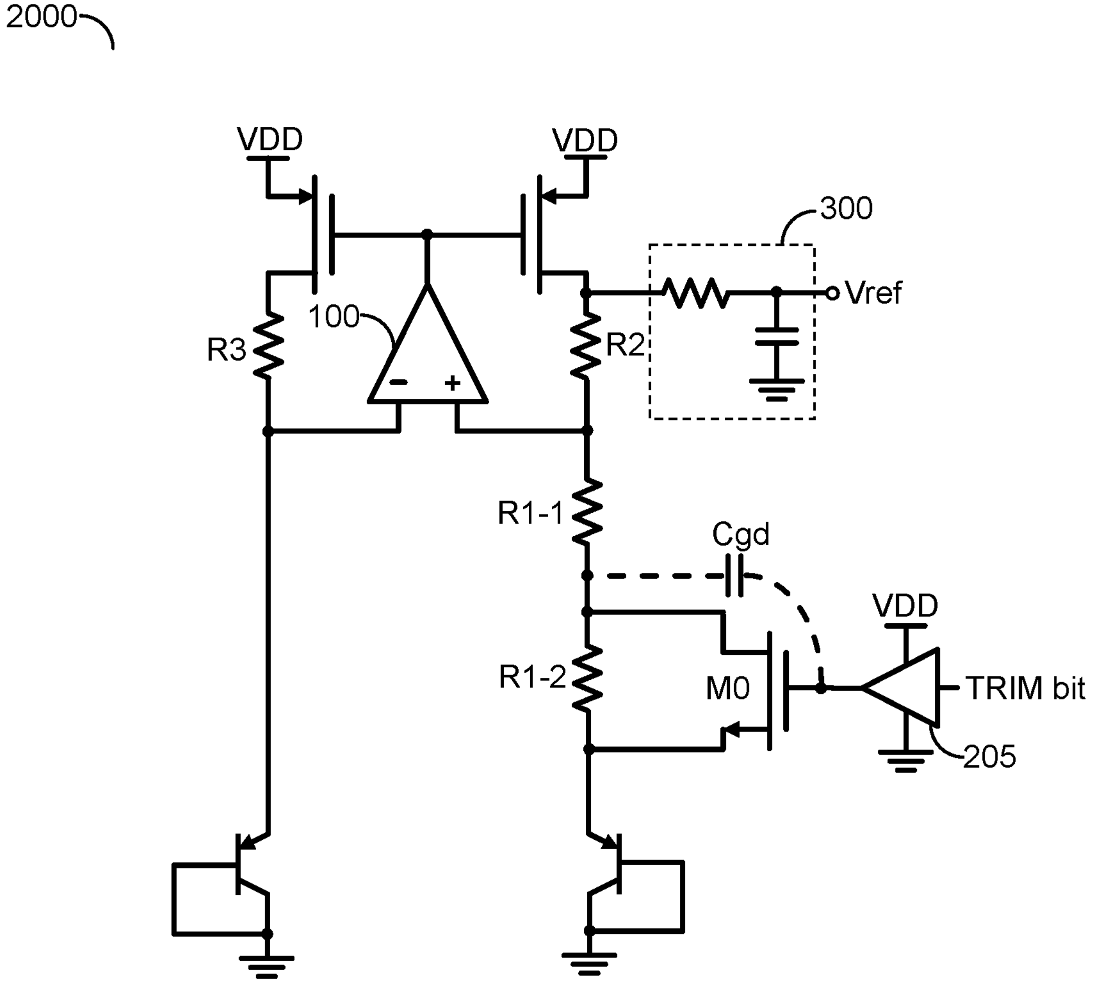
Fig. 2 (Prior Art)
FIG. 2 shows another prior art reference circuit.
Figure 3:
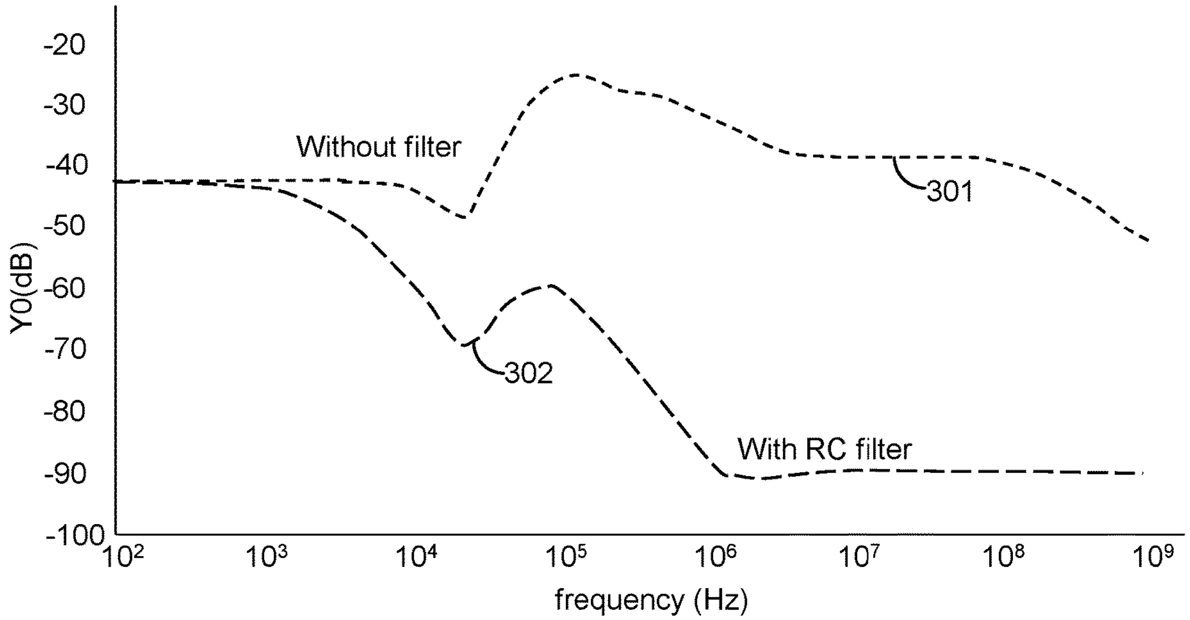
Fig. 3 (Prior Art)
FIG. 3 shows frequency response curves of the PSRR corresponding to FIG. 1 and FIG. 2.
Figure 6:
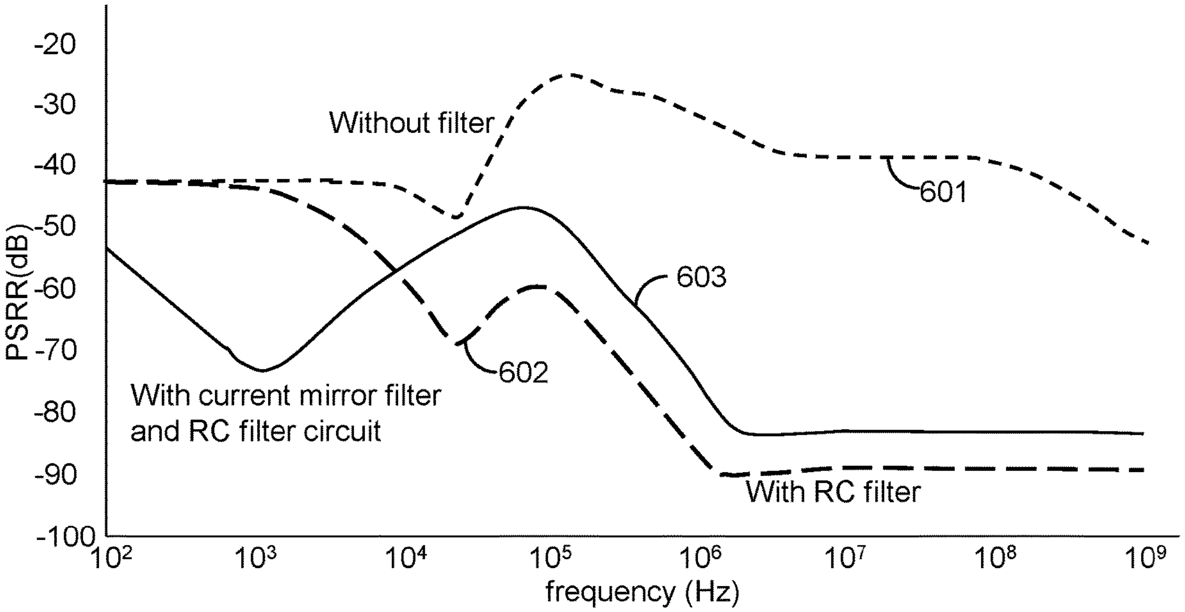
FIG. 6 shows frequency response curves of the PSRR of the prior art reference circuits and that of one embodiment of the present invention.

FIG. 6 shows frequency response curves of the PSRR of reference circuits in different configurations. The PSRR curve 601 of the reference circuit 1000 (corresponding to the prior art shown in FIG. 1), without filtering, is shown in short dashed line. The PSRR curve 602 of the reference circuit 2000 (corresponding to the prior art shown in FIG. 2), with RC filtering at the output, is shown in long dashed line. The PSRR curve 603 of the reference circuit 4000 (corresponding to the present invention shown in FIG. 4), with filtering by the supply transistor Ms and the filter circuit 300, is shown in solid line.

In one embodiment, with RF=5 Mohm and CF2=5 pF, the combination of the aforementioned switch circuit 500 and the filter circuit 300 manage to filter out the supply noise from 100 Hz onwards (603). As shown in FIG. 6, the cutoff frequency is much lower than both prior art circuits (601, 602). Moreover, in one exemplary silicon implementation, the resistance of RF and capacitance of CF2 are lower than those in the prior art shown in FIG. 2, which leads to reduction of chip size up to 30% and hence lower cost is achieved.

Figure 7:
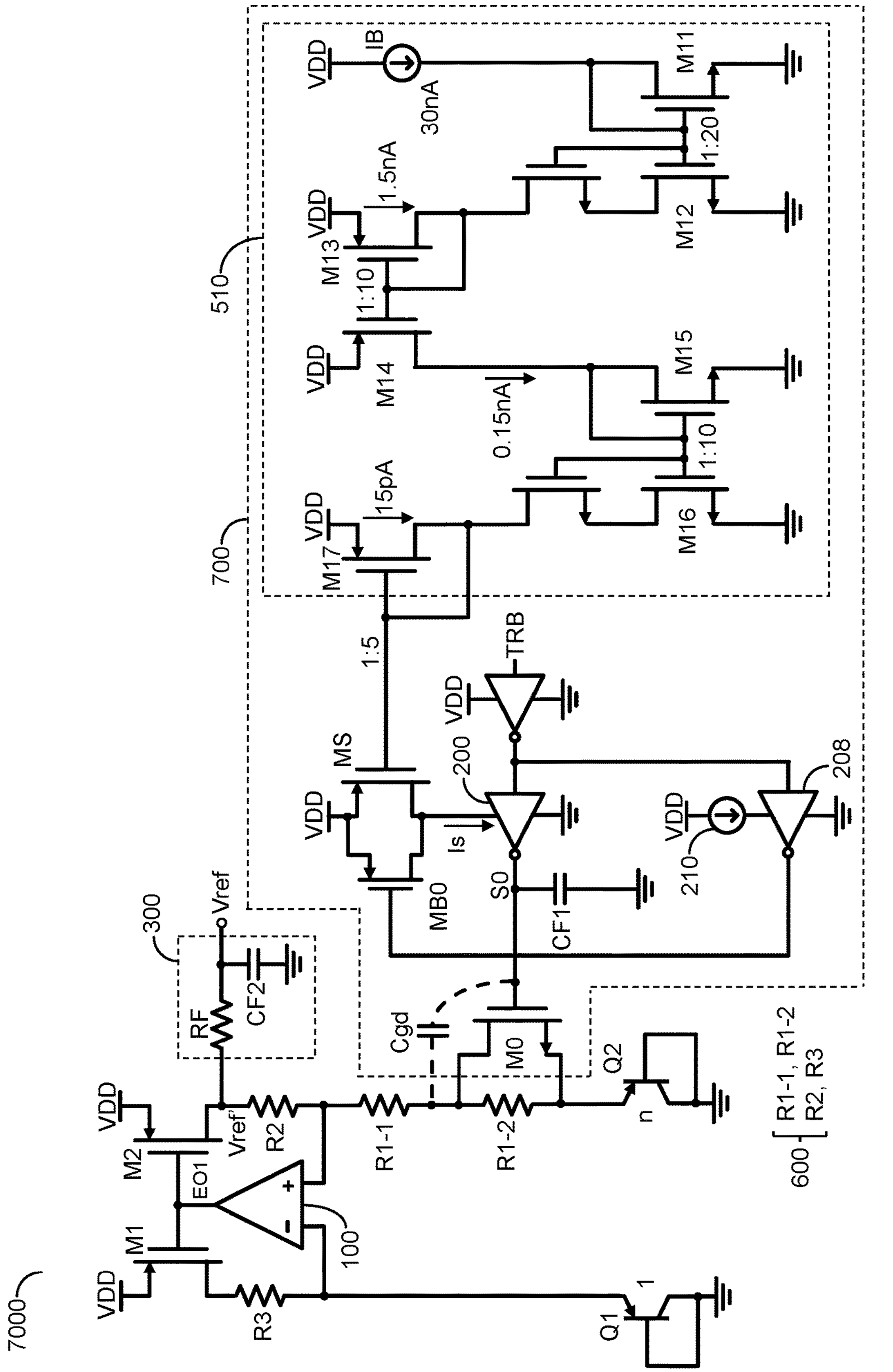
FIG. 7 shows a schematic diagram of the switch circuit according to an embodiment of the present invention.
Figure 8:
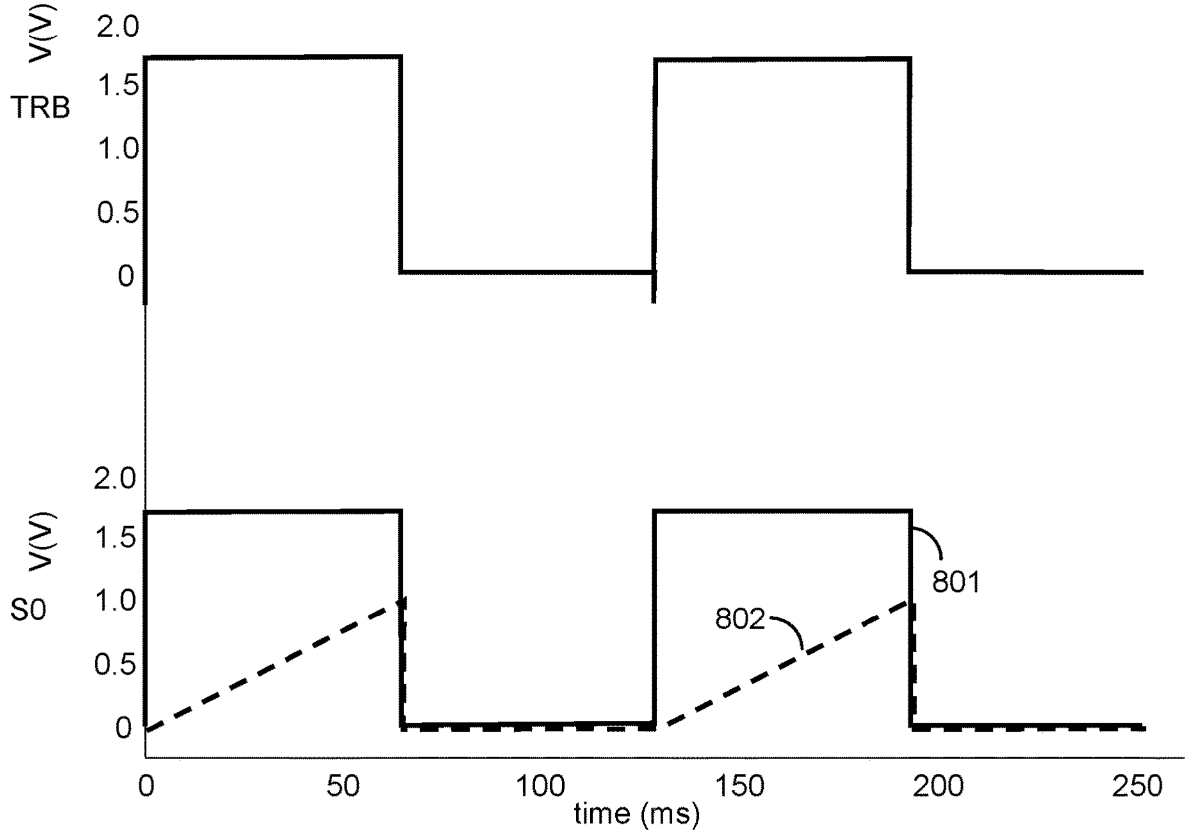
FIG. 8 shows transient waveforms in response to the change of the trimming signal according to an embodiment of the present invention.

Refer to FIG. 7 which shows a schematic diagram of the switch circuit (switch circuit 700) of a reference circuit (reference circuit 7000) according to an embodiment of the present invention. The switch circuit 700 is similar to the previous embodiments and further includes a bypass transistor MB0 which is coupled in parallel with the supply transistor Ms and is configured to operably bypass the supply transistor Ms during transient or during a bypass mode. More specifically, in one embodiment, a second driver 208 controls the bypass transistor MB0 according to the trimming signal TRB. Refer to FIG. 7 in conjunction with FIG. 8, which shows transient waveforms in response to the change of the trimming signal TRB. As shown in FIG. 8, with the bypass transistor MB0 (curve 801), the control signal S0 for controlling the switch M0 rises much faster than the control signal S0 without the bypass transistor MB0 (curve 802). In other embodiments, the bypass mode can be controlled by an instruction, or can be applied during start-up.

Still referring to FIG. 7, in one embodiment, the switch circuit 500 further includes a second driver 208 configured to operably drive the bypass transistor MB0. Also for preventing the noise from input power VDD, the second driver 208 is powered by a current source 210.

Figure 9:
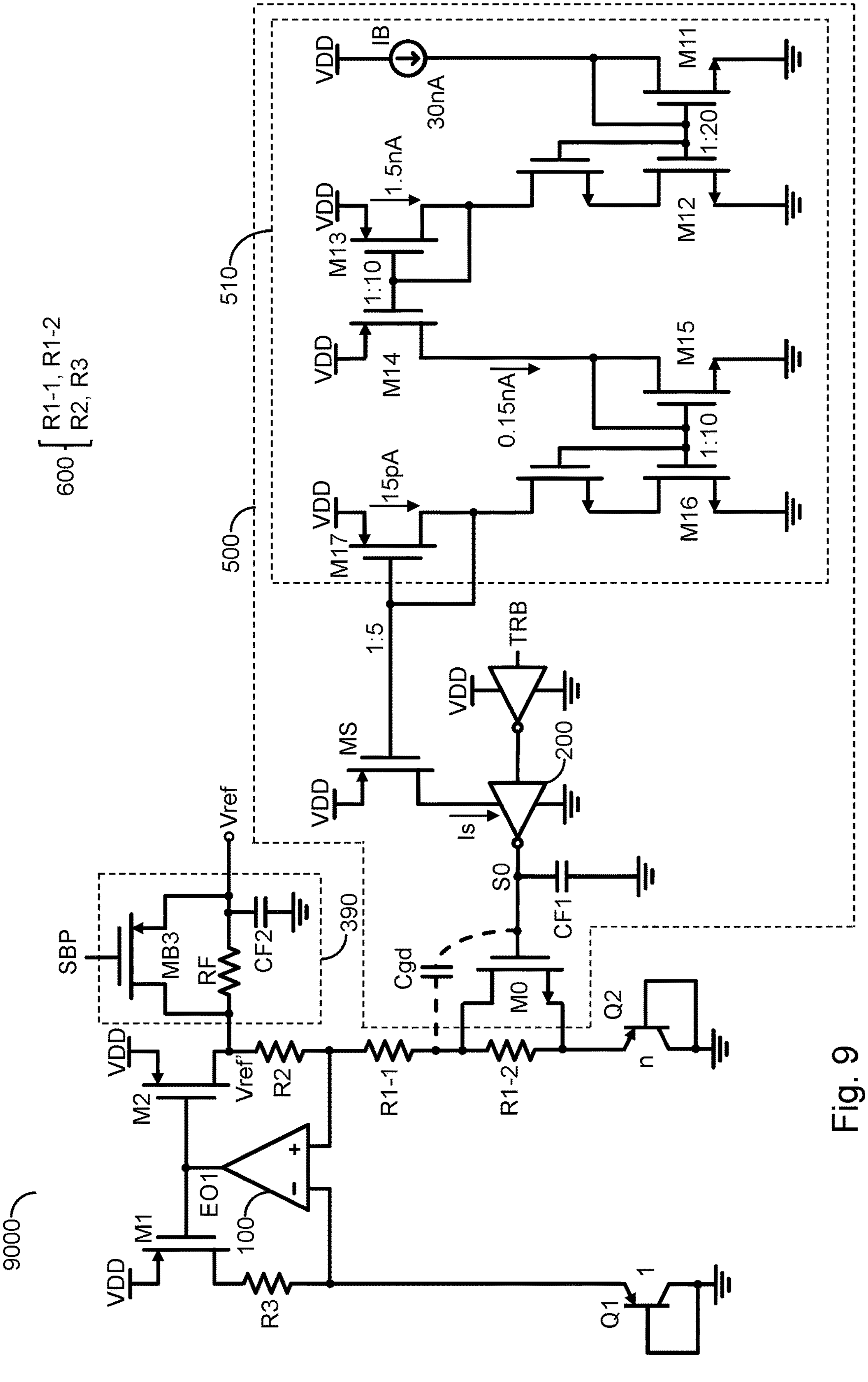
FIG. 9 shows a schematic diagram of the reference circuit according to an embodiment of the present invention.

Refer to FIG. 9 which shows a schematic diagram of the reference circuit according to an embodiment of the present invention. In one embodiment, the filter circuit 390 is similar to the aforementioned filter circuit 300 and further includes a second bypass transistor MB3 which is configured to operably bypass the low pass filter formed by RF and CF2 during a bypass mode. The second bypass transistor MB3 is connected in parallel with the resistor RF and is controlled by a bypass signal SBP.

Figure 10:
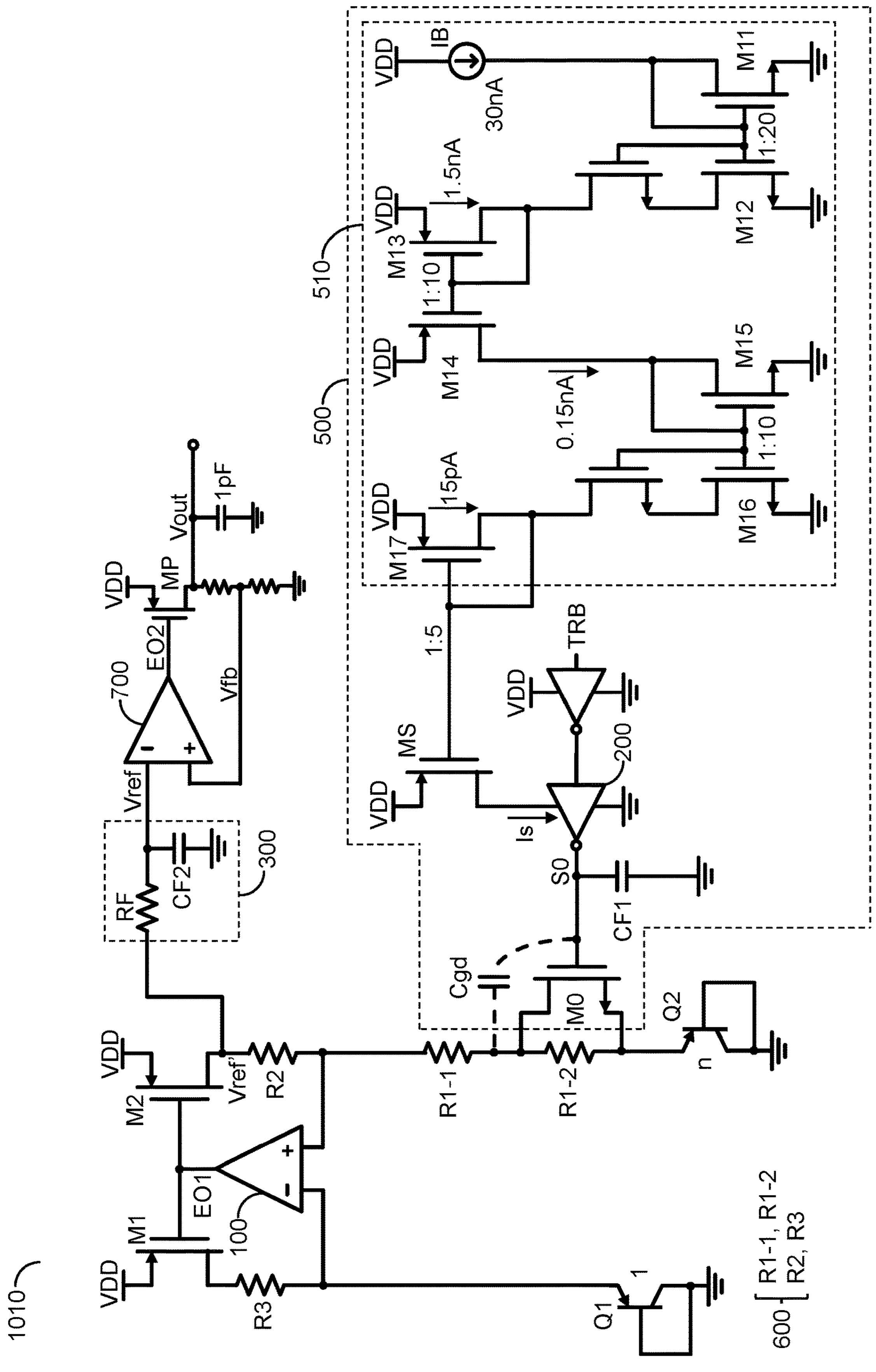
FIG. 10 shows a schematic diagram of the regulator circuit according to an embodiment of the present invention.

Refer to FIG. 10 which shows a schematic diagram of the regulator circuit according to an embodiment of the present invention. The regulator circuit 1010 is configured to operably generate a regulated output signal Vout according to the reference signal Vref. In this embodiment, the regulator circuit 1010 comprises a reference circuit, an error amplifier 700 and an output transistor MP.

The reference circuit can be any of the aforementioned embodiments of the reference circuit, such as those shown in FIG. 4, FIG. 5, FIG. 7 and FIG. 9, which is configured to operably generate the reference signal Vref.

The error amplifier 700 is configured to operably generate an error amplification signal EO2 according to a difference between the reference signal Vref and a feedback signal Vfb. The feedback signal Vfb is correlated to the regulated output signal Vout. For example, as shown in FIG. 10, the feedback signal Vfb is a voltage division of the output signal Vout.

The output transistor MP is controlled by the error amplification signal EO2 and is configured to operably convert an input power (for example VDD) to generate the regulated output signal Vout.

Figure 11:
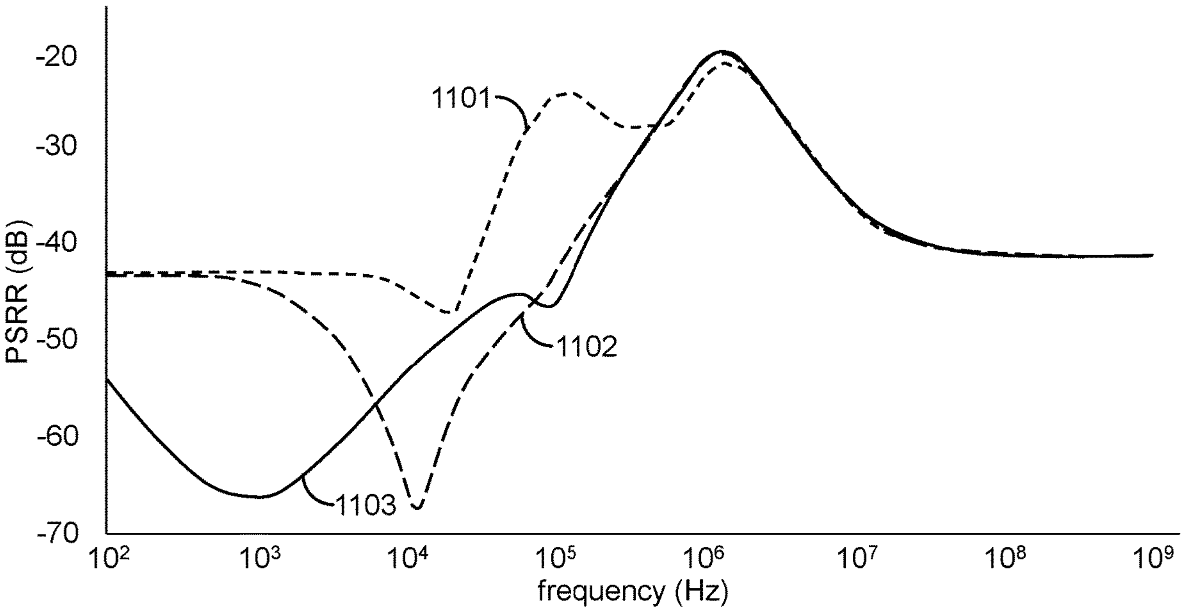
FIG. 11 shows frequency response curves of the PSRR of the prior art regulator circuits and that of one embodiment of the present invention.

FIG. 11 shows frequency response curves of the PSRR of the prior art regulator circuits and that of one embodiment of the present invention. The PSRR curve 1101 of the regulator circuit (corresponding to the prior art shown in FIG. 1), without filtering for the reference signal Vref, is shown in short dashed line. The PSRR curve 1102 of the regulator circuit (corresponding to the prior art shown in FIG. 2), with RC filtering for the reference signal Vref, is shown in long dashed line. The PSRR curve 1103 of the regulator circuit 1010 (corresponding to the present invention shown in FIG. 10), with filtering by the supply transistor Ms and the filter circuit 300, is shown in solid line. As shown in FIG. 11, the PSRR of the present invention is lower covering a much wider frequency range.

It is noteworthy that the aforementioned switch circuit can be applied to other kinds of main circuit or applied for controlling other electrical parameters. As long as the switch Ms determines the PSRR, the aforementioned circuitry is applicable for improving the PSRR of the main circuit.

In summary, to improve the PSRR at low frequency, this invention limits noise from coupling to the switches by utilizing a current mirror operated in deep subthreshold. Combination of the switch circuit and low pass filter circuit at the output can filter power noise across a wide range of frequencies. It is noteworthy that the switch circuit according to the present invention is applicable for improving PSRR in any main circuit wherein a switch is connected to a sensitive node of the main circuit.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switch circuit, comprising:

a switch, coupled to control an electrical parameter of a main circuit, wherein a PSRR (power supply rejection ratio) of the main circuit is determined by the switch;

a first driver, configured to drive the switch, wherein the first driver is powered by a supply current; and a supply transistor, configured to generate the supply current, wherein the supply transistor is biased in a subthreshold region, such that the PSRR of the main circuit is higher than a predetermined level within a predetermined frequency range.

2. The switch circuit of claim 1, further including a filtering capacitor, wherein the filtering capacitor is coupled to an output terminal of the first driver.

3. The switch circuit of claim 1, further comprising a current mirror circuit, wherein the current mirror circuit includes the supply transistor and mirrors a bias current to the supply current, wherein a ratio of the bias current to the supply current is larger than 1 to an extent that the supply transistor is biased in the subthreshold region.

4. The switch circuit of claim 3, wherein the supply transistor includes a PMOSFET which is coupled between a power source and a power terminal of the first driver.

5. The switch circuit of claim 1, further comprising a bypass transistor which is coupled in parallel with the supply transistor and is configured to bypass the supply transistor during transient.

6. The switch circuit of claim 5, further comprising a second driver configured to drive the bypass transistor, wherein the second driver is powered by a current source.

7. The switch circuit of claim 5, wherein the bypass transistor includes a PMOSFET which is coupled between a power source and a power terminal of the first driver.

8. A reference circuit, comprising:

a pair of reference devices having a predetermined bandgap;

an amplification circuit, coupled to the pair of reference devices to generate a reference signal according to the bandgap of the pair of reference devices; and a switch circuit, coupled to the amplification circuit and is configured to control a gain of a feedback network coupled to the amplification circuit, the switch circuit including:

a switch, wherein a PSRR (power supply rejection ratio) of the reference circuit is determined by the switch;

a first driver, configured to drive the switch, wherein the first driver is powered by a supply current; and a supply transistor, configured to generate the supply current, wherein the supply transistor is biased in a subthreshold region, such that the PSRR of the reference circuit is higher than a predetermined level within a predetermined frequency range.

9. The reference circuit of claim 8, wherein the switch is coupled to a resistor of the feedback network and is configured to trim the gain of the feedback network by controlling the switch on or off.

10. The reference circuit of claim 8, wherein the switch circuit further includes a filtering capacitor coupled to an output terminal of the first driver.

11. The reference circuit of claim 8, wherein the switch circuit further includes a current mirror circuit, wherein the current mirror circuit includes the supply transistor and mirrors a bias current to the supply current, wherein a ratio of the bias current to the supply current is larger than 1 to an extent that the supply transistor is biased in the subthreshold region.

12. The reference circuit of claim 8, further comprising a filter circuit, wherein the filter circuit includes a resistor and a capacitor which are configured as a low pass filter for filtering the reference signal.

13. The reference circuit of claim 12, wherein the filter circuit further includes a second bypass transistor which is configured to bypass the low pass filter during a bypass mode.

14. A regulator circuit, configured to generate a regulated output signal, the regulator circuit comprising:

a reference circuit, configured to generate a reference signal;

an error amplifier, configured to generate an error amplification signal according to a difference between the reference signal and a feedback signal, wherein the feedback signal is correlated to the regulated output signal; and an output transistor, which is controlled by the error amplification signal and is configured to convert an input power to generate the regulated output signal;

wherein the reference circuit includes:

a pair of reference devices having a predetermined bandgap;

an amplification circuit, coupled to the pair of reference devices to generate a reference signal according to the bandgap of the pair of reference devices; and a switch circuit, coupled to the amplification circuit and is configured to control a gain of a feedback network coupled to the amplification circuit, the switch circuit including:

a switch, wherein a PSRR (power supply rejection ratio) of the reference circuit is determined by the switch;

a first driver, configured to drive the switch, wherein the first driver is powered by a supply current; and a supply transistor, configured to generate the supply current, wherein the supply transistor is biased in a subthreshold region, such that the PSRR of the reference circuit is higher than a predetermined level within a predetermined frequency range.

15. The regulator circuit of claim 14, wherein the switch circuit further includes a filtering capacitor coupled to an output terminal of the first driver.

16. The reference circuit of claim 14, wherein the switch circuit further includes a current mirror circuit, wherein the current mirror circuit includes the supply transistor and mirrors a bias current to the supply current, wherein a ratio of the bias current to the supply current is larger than 1 to an extent that the supply transistor is biased in the subthreshold region.

* * * * *